United States Patent
Rusconi Clerici et al.

(10) Patent No.: US 9,393,505 B2
(45) Date of Patent: Jul. 19, 2016

(54) GRINDING AND DEWATERING APPARATUS OF FOOD WASTE BY CENTRIFUGATION

(71) Applicants: Piero Rusconi Clerici, Milan (IT); Rinaldo Franceschini, Sarnico-Bargamo (IT); Giampiero Volante, Leggiuno-Varese (IT)

(72) Inventors: Piero Rusconi Clerici, Milan (IT); Rinaldo Franceschini, Sarnico-Bargamo (IT); Giampiero Volante, Leggiuno-Varese (IT)

(*) Notice: Subject to any disclaimer, the term of this patent is extended or adjusted under 35 U.S.C. 154(b) by 0 days.

(21) Appl. No.: 14/398,963

(22) PCT Filed: May 13, 2013

(86) PCT No.: PCT/IB2013/000911
§ 371 (c)(1),
(2) Date: Nov. 4, 2014

(87) PCT Pub. No.: WO2013/171561
PCT Pub. Date: Nov. 21, 2013

(65) Prior Publication Data
US 2015/0136683 A1    May 21, 2015

(30) Foreign Application Priority Data
May 15, 2012    (IT) .............................. MI2012A0836

(51) Int. Cl.
| B01D 33/00 | (2006.01) |
| F26B 5/08 | (2006.01) |
| B04B 3/00 | (2006.01) |
| B02C 18/10 | (2006.01) |
| B04B 5/10 | (2006.01) |
| B04B 11/08 | (2006.01) |

(Continued)

(52) U.S. Cl.
CPC ............ *B01D 33/00* (2013.01); *B02C 18/0092* (2013.01); *B02C 18/10* (2013.01); *B02C 18/2216* (2013.01); *B04B 3/00* (2013.01); *B04B 5/10* (2013.01); *B04B 11/08* (2013.01); *F26B 5/08* (2013.01); *B04B 2005/105* (2013.01); *F26B 2200/02* (2013.01)

(58) Field of Classification Search
None
See application file for complete search history.

(56) References Cited

U.S. PATENT DOCUMENTS

| 2,832,546 | A | * | 4/1958 | Sprague ...................... 241/46.01 |
| 3,823,879 | A | * | 7/1974 | Johnson ...................... 241/101.2 |
| 4,183,470 | A | * | 1/1980 | Hovartos et al. ......... 241/46.013 |

(Continued)

FOREIGN PATENT DOCUMENTS

| JP | S51116678 | 9/1976 |
| JP | S54107165 | 8/1979 |

(Continued)

*Primary Examiner* — Robert James Popovics
(74) *Attorney, Agent, or Firm* — Themis Law

(57) ABSTRACT

A grinding and dewatering apparatus by centrifugation for highly selective differentiated food waste collection includes, in a supporting structure, a hopper introducing waste-products into a grinding chamber and subsequently into a centrifuge having an inner body and an outer body with a finely perforated, coaxial side wall, a deceleration chamber of the filtered water, a motor driving a grinding unit and the centrifuge, wherein the motor integrally activates both the grinding unit and the centrifuge and overlies both, and a discharge for evacuation of the ground waste-products. Both the grinding unit and the inner and outer bodies of the centrifuge are positioned in a deceleration chamber and are arranged integrally with a rotating disc, and the discharge is a movable discharge that can be selectively positioned below openings, situated in a flanged extension arranged below for closing the centrifuge for evacuation of the ground waste-products into a collection basket.

7 Claims, 7 Drawing Sheets

(51) Int. Cl.
*B02C 18/22* (2006.01)
*B02C 18/00* (2006.01)

(56) References Cited

U.S. PATENT DOCUMENTS

| | | | | |
|---|---|---|---|---|
| 4,337,901 | A | * | 7/1982 | Ogura ..................... 241/46.013 |
| 5,149,424 | A | * | 9/1992 | Lundquist .............. B01D 33/11 134/104.2 |
| 5,217,628 | A | * | 6/1993 | Lundquist .......... B01D 11/0276 209/725 |
| 5,227,057 | A | * | 7/1993 | Lundquist .............. B01D 33/11 210/174 |
| 5,971,303 | A | * | 10/1999 | Pugh-Gottlieb ......... 241/46.013 |
| 6,576,140 | B1 | * | 6/2003 | Batten ........................... 210/744 |
| 8,002,979 | B2 | * | 8/2011 | Bryan-Brown ................ 210/173 |
| 8,584,977 | B2 | * | 11/2013 | Park et al. ................. 241/46.013 |
| 2006/0091050 | A1 | * | 5/2006 | Hwang ............... A47J 37/1223 210/167.28 |
| 2006/0283991 | A1 | * | 12/2006 | Nishikawa et al. ...... 241/46.013 |
| 2007/0001039 | A1 | * | 1/2007 | Steinbeck ................ 241/46.013 |
| 2007/0181719 | A1 | * | 8/2007 | Berger et al. ............ 241/46.013 |
| 2009/0179097 | A1 | * | 7/2009 | Nishikawa et al. ...... 241/46.013 |
| 2015/0136683 | A1 | * | 5/2015 | Rusconi Clerici et al. ... 210/368 |

FOREIGN PATENT DOCUMENTS

| | | |
|---|---|---|
| JP | S55177840 | 12/1980 |
| JP | S6422357 | 1/1989 |
| JP | H02068152 | 3/1990 |

* cited by examiner

GRINDING AND DEWATERING APPARATUS OF FOOD WASTE BY CENTRIFUGATION

The present invention relates to a grinding and dewatering apparatus by centrifugation for highly selective differentiated food waste collection.

The differentiated collection of waste and the re-use of the same in a new form have long been the object of numerous initiatives in a world in which environmental sustainability represents one of the greatest challenges for safeguarding the future of the Planet and its possible development.

Among the various fractions that form part of so-called Urban Solid Waste (USW), that relating to food waste represents a significant percentage (between 20% and 30%). This type of waste is certainly one of the most complicated to manage due to its very characteristics (liquids and solids often together) and natural decay phenomena which rapidly make it unpleasant to the senses and the source of considerable discomfort for civil life.

Differentiated collections respond to the logic of re-using waste products in a directly proportional way: in other words, the more selective a collection is, the greater possibility there is of its efficient re-use.

The case of food waste is in certain aspects the most emblematical for various reasons: the biological fermentation process (aerobic for composts/fertilizers or anaerobic for biogas and digestates) is particularly sensitive to the quality of the mass collected. The product obtained may or may not fall within the cycle of use, often linked to the food chain, due to its quality. Only high-quality composts, in fact, have an agronomical use, whereas standard composts are used for filling technical compartments of landfills or for environmental restoration.

There are various wet differentiated collection techniques: ranging from manual methods, in specific biodegradable bags or buckets, to those effected with mechanical devices. Among these, garbage disposal units or dissipators by the centrifugation of food waste, are widely used in numerous countries especially having an Anglo-Saxon culture, which, thanks to a specific shredding technique (grinding by centrifugal abrasion) and an optimum collocation (the kitchen) as it is close to the waste-producing moment, allow a significant quality in the selection of waste collection.

These devices, however, are often limited in use for various technical, juridical or organizational reasons (among the former, the risk of excessive sedimentations in the sewerage system where the ground waste-products are sent). This is mainly the case with dissipators for professional use which treat more sedimenting waste-products with respect to those normally present in household feeding supplies and in significant quantities concentrated in a specific sewage outlet.

One of the solutions of this type of limit consists of so-called dewaterers by centrifugation, composed of one (or more) dissipator(s) or grinder(s) connected to a squeezing or centrifugation apparatus of the wastewater coming from the dissipators, which separates the process water from the solid particles of crushed waste.

The most common devices of this type currently on the market consist of: a dissipator or grinder, activated by a motor, and a squeezer, also motorized. The squeezer consists of a cochlea coaxial to a filtering basket through which water and finer particles pass before flowing into the drainage system and subsequently into the public sewerage system.

The process envisages that the waste-product be initially fed into a hopper and subsequently passes from this into the grinder carried by an adequate flow of water. The waste-product is then conveyed to the squeezer described above, occasionally pushed by conveyor pumps. Some devices are equipped with water recovery and recirculation systems in order to limit its use.

Patent EP 1 360 013 discloses a further solution in which dissipator/grinder and centrifuge are positioned adjacently with respective motors or movement transmissions which are cumbersome and complicated when functioning, or are arranged coaxially requiring not only double motorization but also an ample encumbrance in width.

These known composite devices consequently create various problems.

First of all, in fact, they have a certain encumbrance due to the presence of the motors and various components which make them difficult to position inside professional kitchens. In these kitchens, in fact, there is always a limited amount of space and the areas currently dedicated to the collection and storage of waste-products are awkward and restricted, often being limited to what is necessary for housing a simple waste-bin containing a bag.

This arrangement also creates various intervention problems for maintenance or repair.

They are often also dimensioned for processing enormous quantities of waste-products and they have a high cost.

Again, in the known devices, there is a considerable consumption of water and energy for their correct functioning.

Furthermore, a double motorization or cumbersome and complex movement transmissions must be envisaged, with functioning problems.

JP 2068152 illustrates a dewatering unit of waste-products in which there is a motor which determines, through three complex chain and conical gear transmissions, the three separate movements of a rotor inside a centrifuge and grinding blades operating with blades fixed to the framework, an outer rotor of the centrifuge, and finally feeding means from a side hopper.

As already indicated, the grinding means are situated outside the centrifuge, above it, between the supporting structure of the apparatus and an upper extension of the internal rotor. The internal rotor also carries a spiral blade on its outer wall which removes the waste deposited on the internal wall of the outer rotor. An underlying central opening allows the waste-products to exit without their liquid content.

Not even is this type of apparatus capable of solving problems relating to the encumbrance and functioning complexity, or the complicated movement transmissions previously indicated, and it does not have technical characteristics of a highly selective differentiated waste collection in the grinding technique envisaged.

A general objective of the present invention is to solve the drawbacks of the known art described above in an extremely simple, economical and particularly functional manner.

A further objective of the present invention is to provide a grinding and dewatering apparatus by centrifugation for highly selective differentiated food waste collection, which is particularly simple and functional, with a number of constituent elements and motors reduced to the minimum.

Another objective of the present invention is to provide a grinding and dewatering apparatus by centrifugation for highly selective differentiated food waste collection, having a reduced space, on which every intervention necessary for its functioning and maintenance and also simple cleaning, is facilitated.

Yet another objective of the present invention is to provide a grinding and dewatering apparatus by centrifugation for highly selective differentiated food waste collection, with a limited water and power consumption.

In view of the above objectives, according to the present invention, a grinding and dewatering apparatus by centrifugation for highly selective differentiated food waste collection has been conceived, having the characteristics specified in the enclosed claims.

The structural and functional characteristics of the present invention and its advantages with respect to the known art will appear even more evident from the following description, referring to the enclosed drawings which illustrate, inter alia, schematizations of embodiments of grinding and dewatering equipment by centrifugation, for highly selective differentiated food waste collection, produced according to the same invention.

Figure 1:
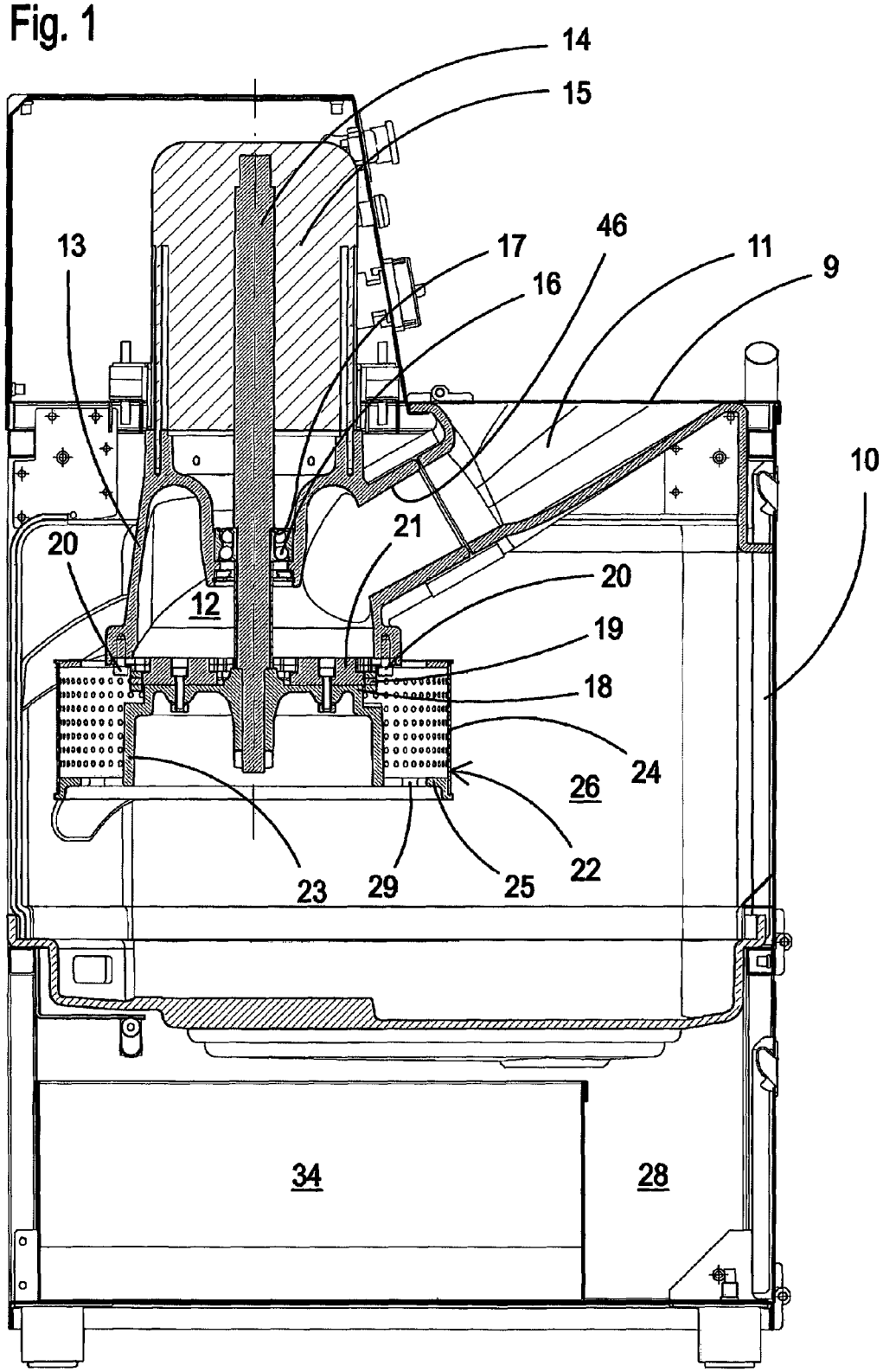
FIG. 1 shows a raised side section of a first embodiment of an apparatus according to the present invention.

With reference to FIG. 1, this illustrates as a whole, a grinding and dewatering apparatus by centrifugation for highly selective differentiated food waste collection according to the present invention.

Said grinding and dewatering apparatus by centrifugation for highly selective differentiated food waste collection comprises a supporting structure 10 on which the actual apparatus is housed.

In particular, it can be observed that the apparatus comprises a hopper 11 for the introduction of waste directly connected to a grinding chamber 12, through the opening of an upper articulated protection lid 9. The hopper 11 is tilted tangentially with respect to the grinding chamber 12 to allow a radial entry and reduce encumbrances, thus facilitating said introduction.

The grinding chamber 12 is defined inside a conical-truncated body 13 which houses a shaft 14 connected to a motor 15. The motor 15 is situated above the conical-truncated body 13, it has a vertical axis and the shaft 14 of the motor 15 is supported in rotation by bearings 16 situated in a specific housing 17 forming part of the conical-truncated body 13 of the grinding chamber.

Figure 5:
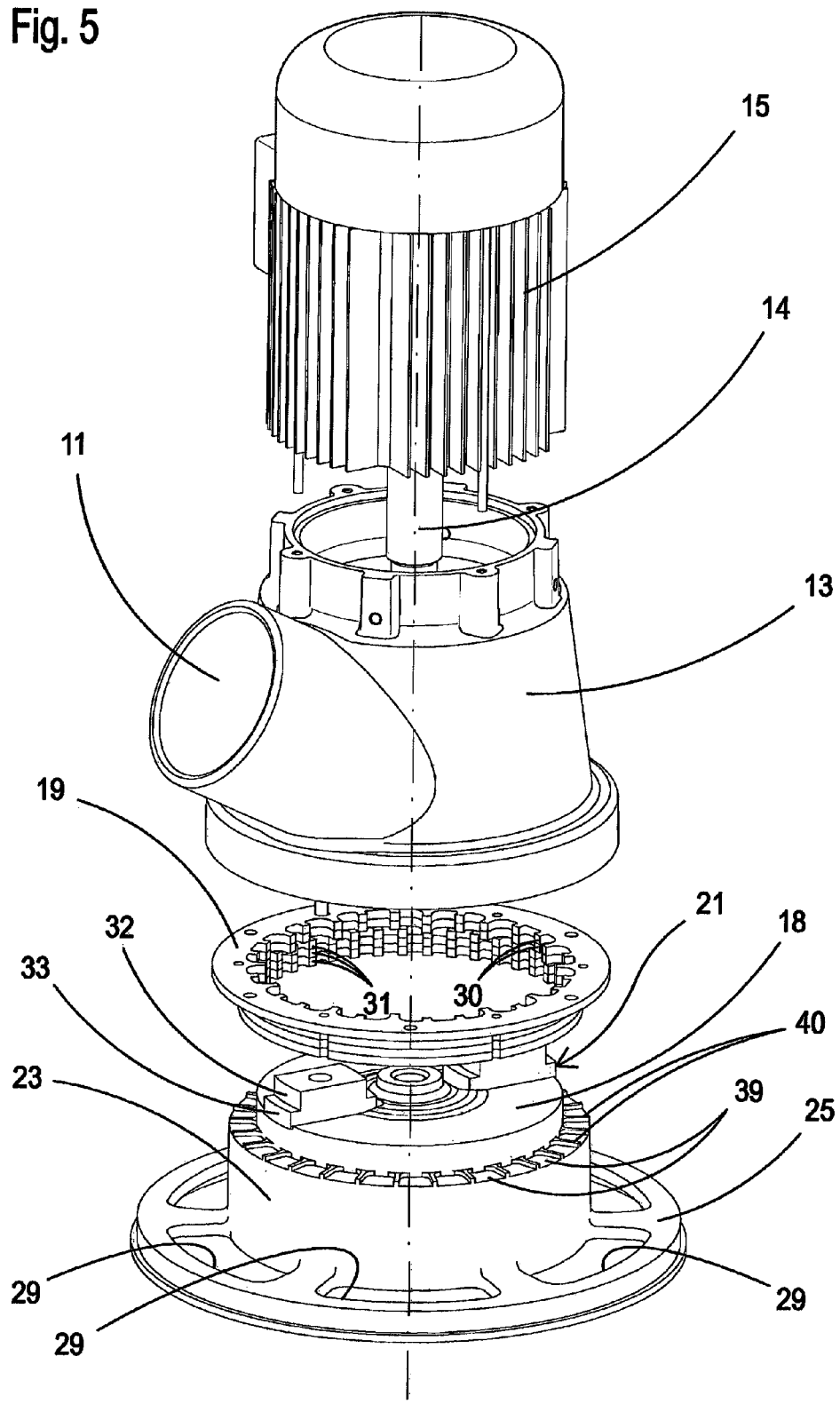
FIG. 5 shows an exploded perspective view of part of the apparatus according to FIG. 1.

A rotating disc 18 is positioned in correspondence with the lower free end of the shaft 14, which, when rotating, projects the waste towards a fixed toothed ferrule 19, causing its grinding. The toothed ferrule 19 is fixed, as it is constrained by means of bolts 20 below the conical-truncated body 13 (FIG. 5).

Again, below the conical-truncated body 13, or rotating disc 18, there is a centrifugation device integral with the disc 18. The rotating disc 18 is coupled with the end of the shaft 14 and carries hammering masses 21 above, which are engaged and interact during grinding with the toothed ferrule 19.

In particular, in the example shown, the arrangement of the toothed ferrule 19 and hammering masses 21 positioned in the grinding chamber, form the grinding means. The toothed ferrule 19 comprises various superimposed rows of teeth (in the example of FIG. 5 indicated with 30 and 31), radially facing the interior, having a differentiated diameter, in order to collaborate with radial surfaces facing the outside of the hammering masses 21 which also have differentiated diameters 32 and 33, produced in a size complementary to the sizes of the diameters of the rows of teeth 30 and 31 of the toothed ferrule 19.

The centrifugation device or centrifuge 22 consists of a cylindrical body 23 which extends below the rotating disc 18, blocked on the shaft 14. Outside this cylindrical body 23, there is an additional cylindrical body 24, coaxial to it, having a larger diameter with a finely perforated side wall to favour the discharge of the water separated, and withhold the solid ground waste-product.

The internal cylindrical body 23 having a smaller diameter in the centrifugation device comprises, above, a series of cavities 39 and crests 40 that cause a projection of the ground product towards the finely perforated wall of the outer cylindrical body 24 and an extremely homogeneous deposition of the same. Furthermore, the internal cylindrical body 23, below, has a flanged extension 25 which is provided with broad openings 29 and which extends radially as far as the outer cylindrical body 24. These openings 29 allow the centrifuged waste-product to be discharged downwardly into a specific collection basket 34. The centrifuge is therefore torus-shaped.

Figure 4:
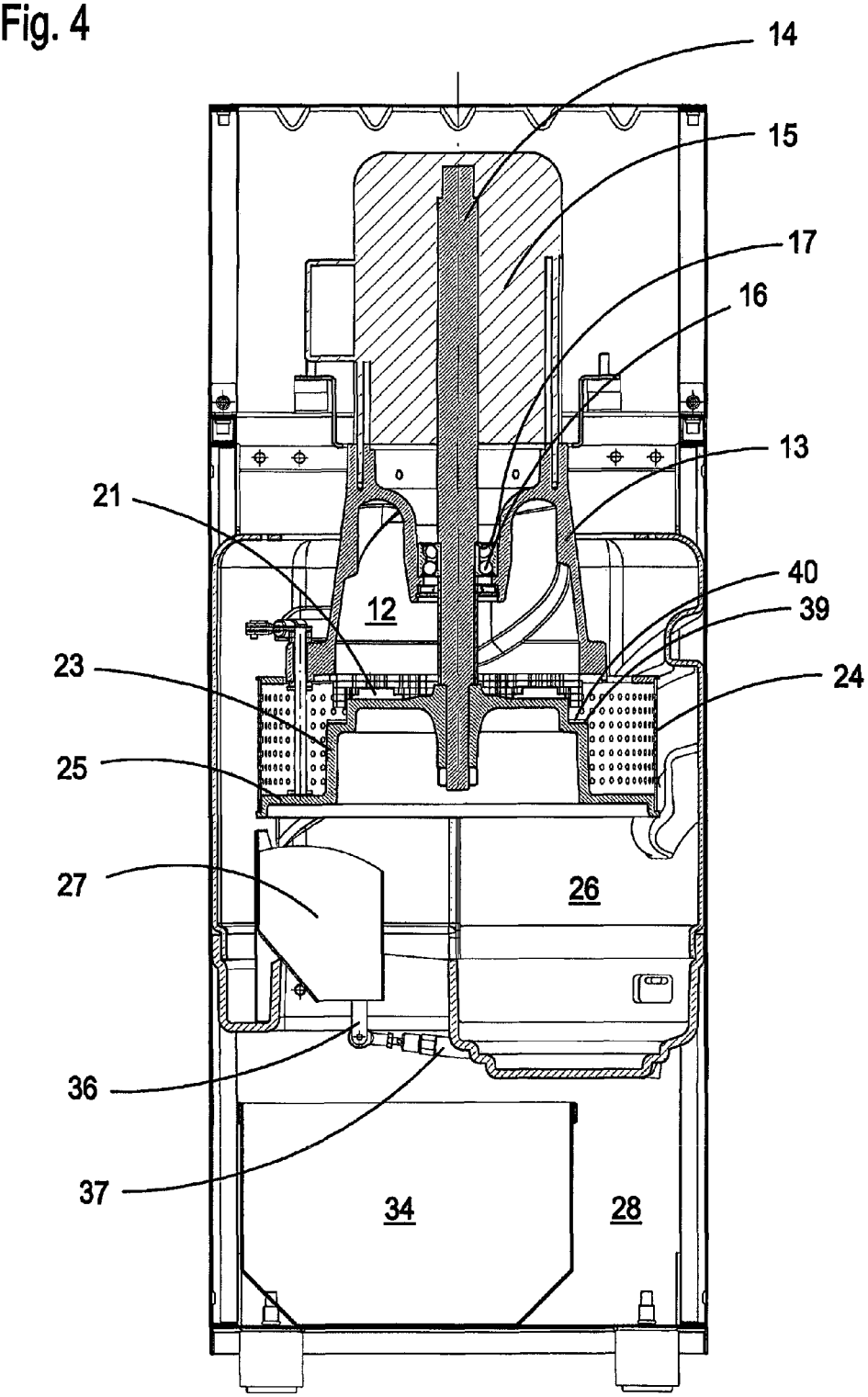
FIG. 4 shows a raised side section from behind of an apparatus according to the present invention.

The openings 29 in the flanged extension 25, when brought in correspondence with a lower discharge duct (FIGS. 2 and 4), allow the discharge of the solid waste-products detached from the finely perforated wall of the outer cylindrical body 24 of the centrifuge.

Figure 2:
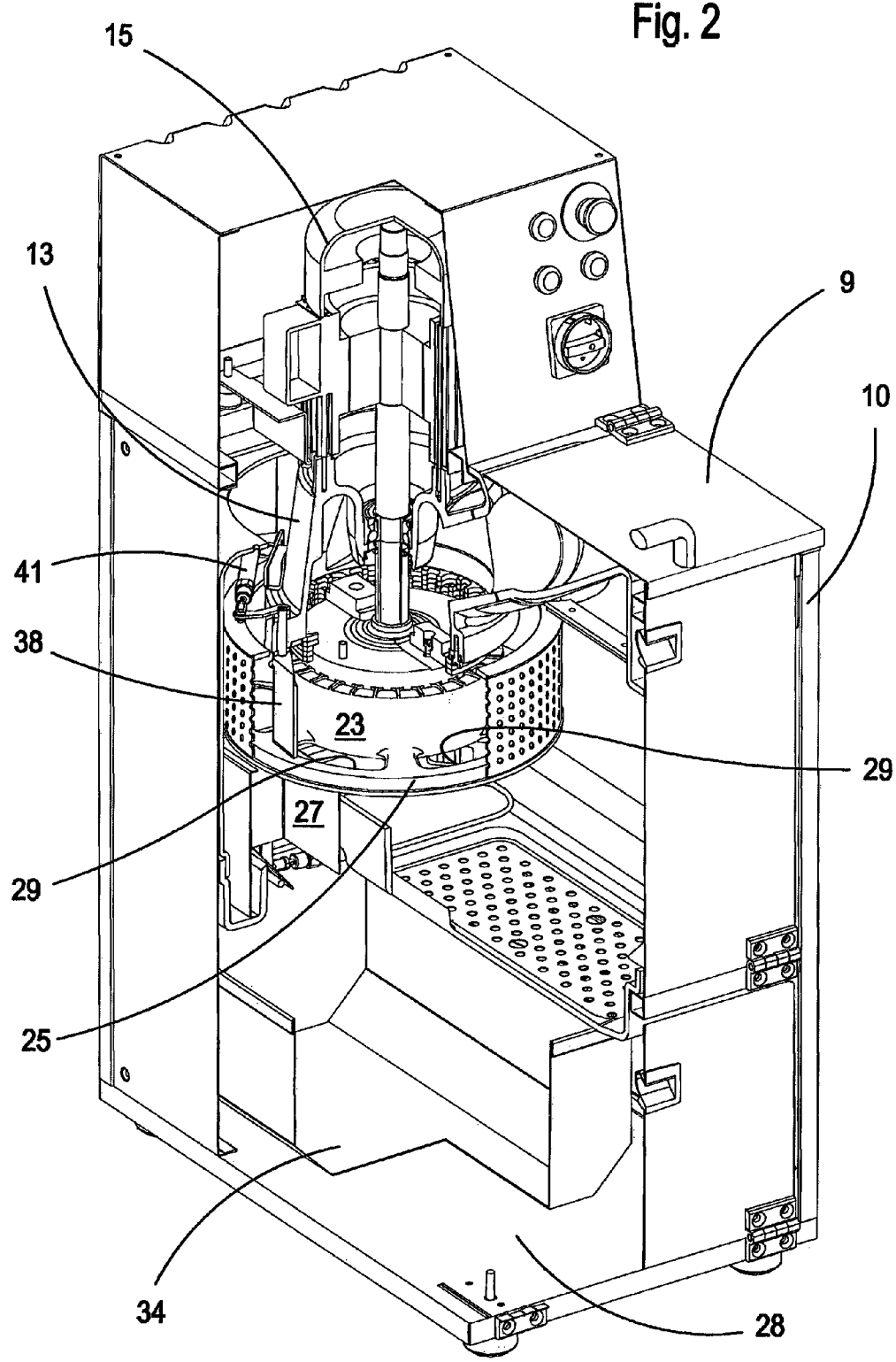
FIG. 2 shows a front perspective view, in a partial cross-section, of the apparatus according to FIG. 1.
Figure 3:
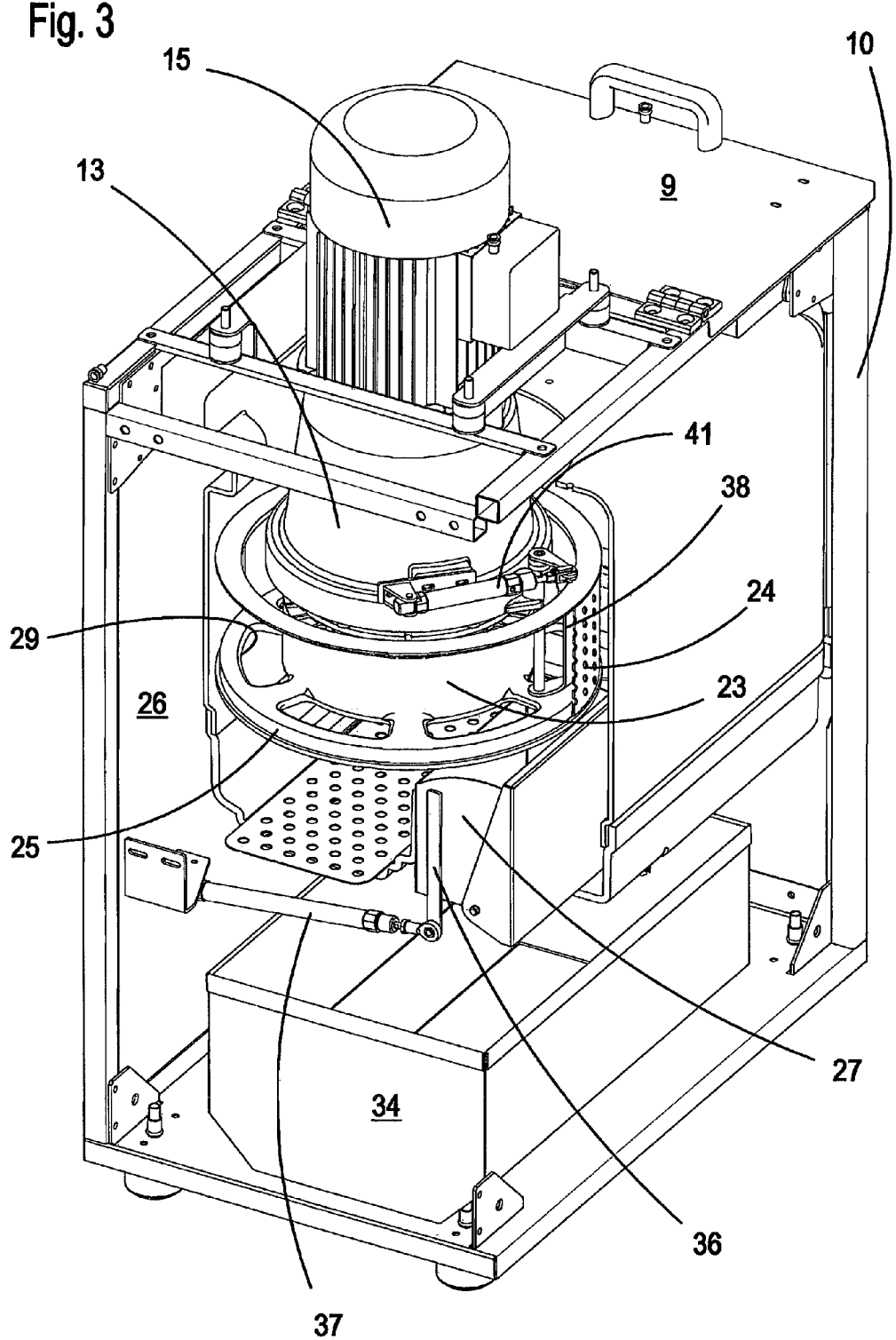
FIG. 3 shows a perspective view from behind, in a partial cross-section, of the apparatus according to FIG. 1.

The discharge duct 27 has the particular feature of being integrated with the bottom of a deceleration chamber 26 so that, when not in use, it is housed in the bottom of said chamber, whereas when it is functioning, i.e. when discharging, it is lifted from the bottom through the mechanical activation of a lever 36 driven by an actuator 37. This lifting ensures that the duct 27 is in a position close to the openings 29 of the centrifuge, in order to facilitate the collection of the waste-product in the detachment phase from the finely perforated wall of the centrifuge, thanks to the action of a doctor blade 38 driven by an actuator 41. FIG. 2 shows the centrifuge 22 without the finely perforated side wall 24 to allow the internal parts and the doctor blade 38 to be viewed. The waste-products are detached by means of the doctor blade 38 and fall into the removable container 34 positioned in the compartment 28 situated below the deceleration chamber of the water 26, aligned with the centrifuge for collecting the ground waste-product.

In a preferred embodiment, both the movable discharge 27 and doctor blade 38 are activated by hydraulic actuators fed by mains water with an adequate pressure.

Figure 6:
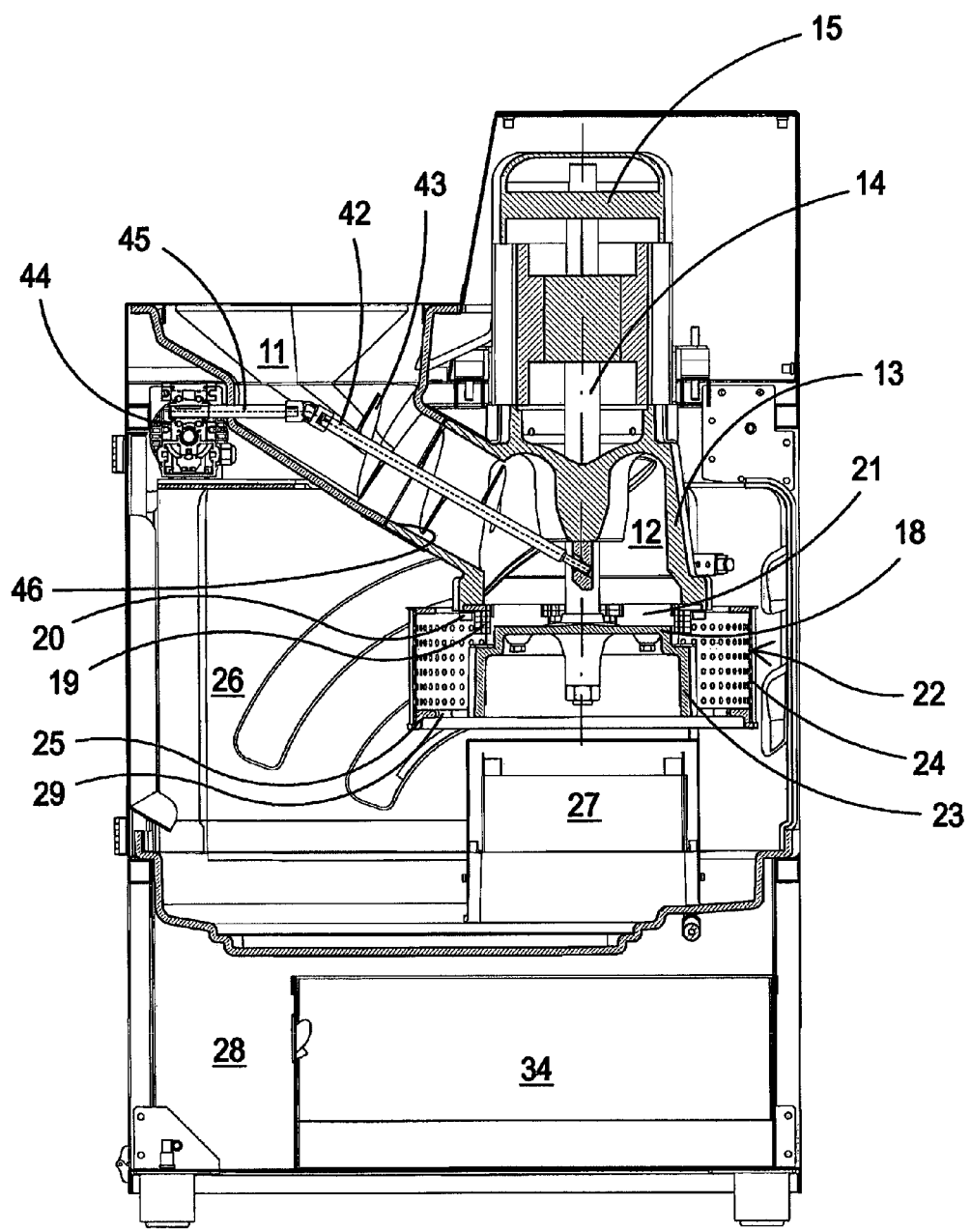
FIG. 6 shows a raised side section of a further embodiment of an apparatus according to the present invention.
Figure 7:
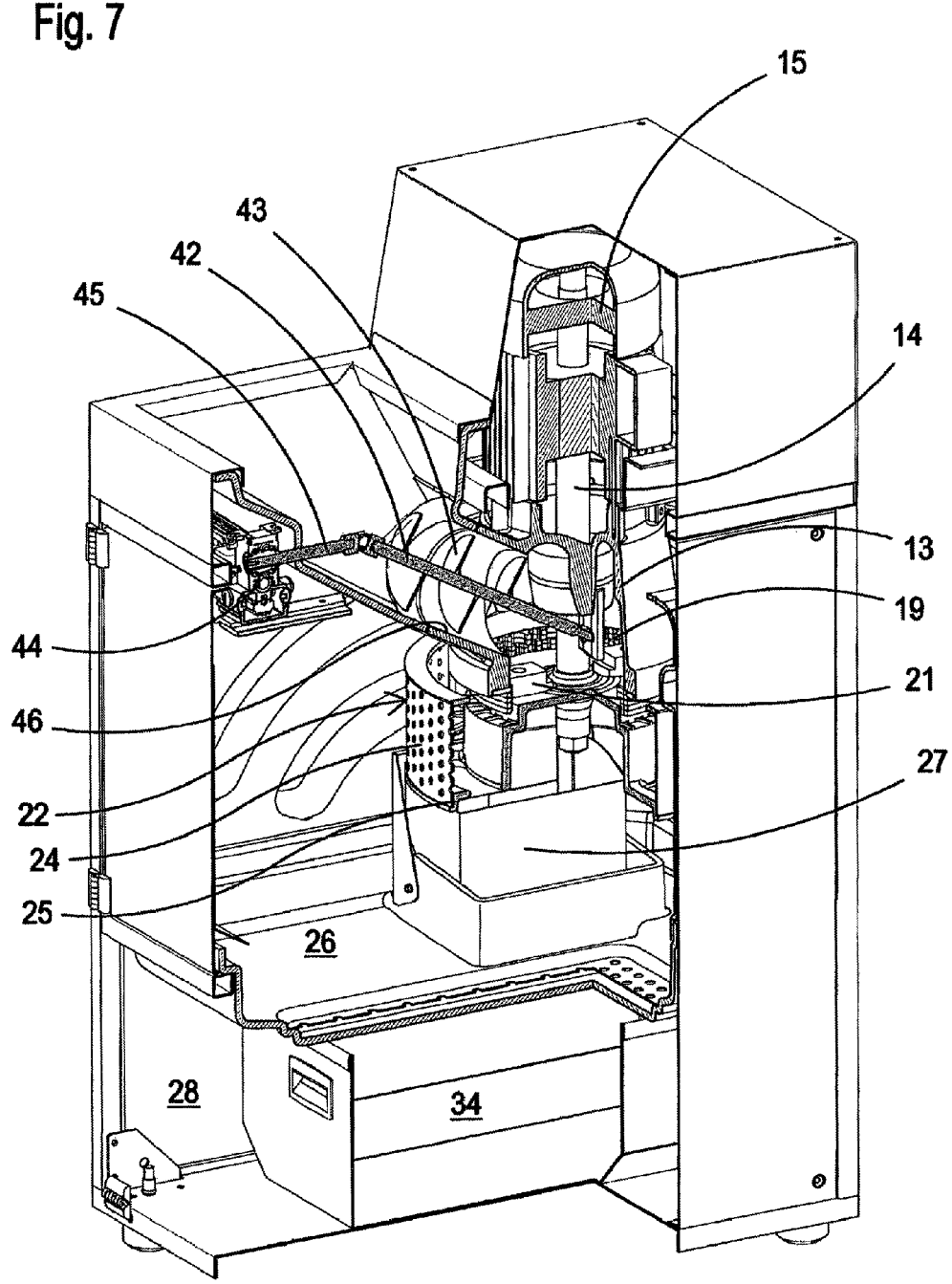
FIG. 7 shows a front perspective view, in a partial cross-section, of the apparatus according to FIG. 6.

In a further embodiment shown in FIGS. 6 and 7, an apparatus is proposed, which is capable of exerting additional functions, in which the same elements are indicated with the same reference numbers.

With this alternative embodiment, a solution has also been found, according to the invention, to the fact that in some cases, the dimension or form of the waste-products can be incompatible with the size of the feeding duct from the hopper to the grinding chamber 12 which leads to a blockage of the machine. From the point of view of simple functionality of use, this drawback can be solved by opening the protection lid 9 (not shown in FIGS. 6 and 7) and then, with the machine stopped, by acting manually or with an adequate manual instrument which pushes the block of material into the grinding chamber 12. This operation is evidently awkward and in any case non-conclusive if another obstacle is subsequently formed thus requiring a manual intervention.

A possible solution is represented by the insertion into the basin of the hopper 11 of a cochlea feeding device of the waste-product. The device comprises a shaft 42 having a helicoidal profile or cochlea 43 protruding radially, which can be activated manually or alternatively by an electric motor 44 connected to it by means of a transmission 45. The cochlea device is such as to favour the safe introduction of the waste-product into an inlet duct 46 in the grinding chamber 12. The duct 46 is preferably tilted tangentially to the grinding chamber 12.

In this configuration, in fact, the waste-product introduced into the hopper 11, is pushed into the grinding chamber 12 by the same movement of the helicoid 43 having an adequately lengthy feed pitch.

In addition to this aspect, which improves the efficiency of use in the machine, the hopper 11 equipped with the helix inlet device facilitates the determination of the quantity of waste-product that the machine can process per single load. This limit is, in fact, defined by the quantity of ground waste-product that can adhere to the vertical wall of the perforated body 24 forming the centrifuge 22. Through the number of revs of the helicoid, the maximum quantity of ground waste-product that adheres to the wall without interfering with the other organs present in the machine, in particular with the doctor blade 38, can be established with good approximation.

Finally, the helicoid device can allow any continuous use of the apparatus unlike the version without the same. Upon opening the lid 9, in fact, the movement of the device 42 can be stopped, whereas the activity of the motor 15 and therefore the grinding and dewatering, can continue. The cochlea device can therefore exert a blocking activity of the filling of the grinding chamber 12, allowing, on the other hand, the filling of the loading hopper 11. This activity is managed by the electric control panel present in the apparatus.

All the important features forming part of the present invention can be found in these non-limiting examples.

The present invention was conceived bearing in mind the problems previously indicated.

As can be seen, this new solution satisfies the objectives specified as:
- the selective grinding is guaranteed by an abrasive grinding system consisting of rotating hammering masses and a fixed toothed ferrule which send the ground product to the centrifuge;
- there is only one motor, and therefore a reduced installed power with respect to machines having the same performance;
- the space occupied is extremely reduced due to the fact that the grinding and centrifugation operations take place practically consequentially, as the rotating plate and centrifuge are composed of a single element, constrained to the shaft of the motor positioned above the centrifuge;
- the water consumption is extremely reduced as, unlike similar devices, the function of the water flow, normally responsible for carrying the waste-products to the grinding chamber and from there to the separation centrifuge, is reduced here to solely charging into the grinding chamber from which the waste-products are expelled, directly reaching the centrifuge;
- the maintenance and cleaning operations are extremely rapid as the centrifuge can be dismantled through the hatch situated on the wall of the deceleration chamber.

The innovative configuration described derives from the choice of positioning the driving motor for both the grinding and centrifugation, in a position overlying the grinding chamber.

In this way, the apparatus has reduced dimensions as the centrifuge does not have to have diameters consistent with the dimension of the actuation motor as described, for example, in patent EP 1360013.

Furthermore, all of the components of the apparatus fed by an electric current are housed in a position above the area affected by the water flow, and therefore protected from infiltrations of the same, also facilitating and guaranteeing all the safety aspects deriving from accidental contact with an electric current.

The apparatus of the present invention separates the liquid component of waste-products and process water from the ground solid, allowing the component of the waste-product that can generate problems of sedimentation in the sewage system, to be separated and collected. The waste-products can become part of a recovery and re-use for various ecological uses.

The present invention has therefore reached various objectives such as: intrinsic selection capacity of the waste-product, reduction in the dimensions of the machine, reduced production costs, saving of process water, reduction in energy/installed power consumptions, maintenance and cleaning facility.

The first objective is discriminative for the objectives of high-quality differentiated collections and the consequent re-use of the waste-products.

The second objective arises from the fact that the space available inside professional kitchens is always extremely restricted and the areas currently dedicated to the collection and storage of waste-products are awkward and restricted, often being limited to what is necessary for housing a simple waste-bin containing a bag.

The third objective derives from the awareness that although in the presence of national and international regulations oriented towards encouraging a reduction in the dangerousness of waste-products, in reality there are, in the best of cases, limited resources destined for this type of waste and this is partly due to the low re-use of organic mass of a USW origin due to the low quality.

An apparatus designed for this collection, especially if destined for producers of relatively small quantities of waste, therefore has a limited production cost.

The fourth objective satisfies the demands for savings that not only environmental regulations or installations require, but also the increasingly diffused logic of sustainability expects.

As already pointed out, the process water is in fact an element taken into consideration by an increasing number of clients for both the above environmental reasons and also for the cost of the resource.

The installed power and correlated electric energy consumptions are justified for analogous reasons to those previously mentioned and have been taken into consideration in the design of the invention.

The last two characteristics (facility of maintenance and cleaning) derive from intuitable necessities of whoever, at the end of the process, must deal with the maintenance and efficiency of equipment which, due to the type of material processed, can be the source of odours and unpleasant emissions, in addition to attracting insects and other animals attracted by organic substances.

It can be seen that the present invention achieves all of these objectives.

The objective mentioned in the preamble of the description has therefore been reached.

The forms of the structure for providing an apparatus of the invention, as also the materials and assembly modes, can naturally differ from those shown for purely illustrative and non-limiting purposes in the drawings.

The protection scope of the present invention is therefore delimited by the enclosed claims.

The invention claimed is:

1. A grinding and dewatering apparatus by centrifugation for highly selective differentiated food waste collection comprising, in a supporting structure (10):
   a hopper (11) for introduction of waste-products into a grinding chamber (12) and subsequently into a centrifuge (22), said centrifuge comprising an inner body (23) and an outer body (24) with a finely perforated side wall coaxial to the inner and outer bodies;
   a deceleration chamber (26) of filtered water;
   a motor (15) driving a grinding unit (21), said centrifuge (22) being integral with the grinding unit, wherein said motor (15) integrally activates both the grinding unit (21) and said centrifuge (22) and is in a position overlying both (21, 22);
   a discharge for evacuation of the ground waste-products, wherein both said grinding unit (21) and said inner and outer bodies (23, 24) of said centrifuge (22) are positioned in said deceleration chamber (26) and are arranged integrally with a rotating disc (18) disposed between said grinding unit and said inner and outer bodies, said rotating disc being turned by the motor and projecting said waste-products into the grinding unit, and
   wherein said discharge (27) is a duct that is mechanically lifted from a bottom of the deceleration chamber (26) surrounding said centrifuge (22) to be disposed by a proximity of openings (29), situated in a flanged extension (25) that is arranged below said centrifuge and closes said centrifuge (22), when said opening evacuates the ground waste-products into a collection basket (34), such to facilitate conveying the ground waste-products and adhering to the finely perforated wall of the outer body (24) of said centrifuge; and
   a doctor blade (38) selectively movable in engagement with said finely perforated side wall of the outer body (24) of the centrifuge (22) for detaching the centrifuged waste-products.

2. The apparatus according to claim 1, wherein said hopper (11) for the introduction of the waste-products into the grinding chamber (12), houses a cochlea apparatus (42, 43) for feeding and introducing those waste-products having a dimension or form incompatible with a dimension of an inlet duct (46) into said grinding chamber (12).

3. The apparatus according to claim 2, wherein said cochlea apparatus (42, 43) is manual or motorized and is used for a continuous or semi-continuous feeding of the grinding and dewatering apparatus.

4. The apparatus according to claim 1, wherein said discharge (27) and said doctor blade (38) are activated by hydraulic actuators fed by mains water with an adequate pressure.

5. The apparatus according to claim 1, further comprising a duct (46) tilted tangentially with respect to the grinding chamber (12) and positioned in said hopper (11).

6. The apparatus according to claim 1, wherein said grinding chamber (12) is defined inside a conical-truncated body (13), which houses a shaft (14) connected to said motor (15).

7. The apparatus according to claim 6, wherein said grinding unit comprises hammering masses (21), which are positioned on said rotating disc (18) constrained to a lower free end of a shaft (14) coupled with said motor (15) and which are engaged in grinding with a toothed ferrule (19) constrained below said conical-truncated body (13).

* * * * *